(12) United States Patent
Clapham

(10) Patent No.: US 11,416,549 B2
(45) Date of Patent: Aug. 16, 2022

(54) EFFICIENT DATA OBJECT STORAGE AND RETRIEVAL

(71) Applicant: BRITISH TELECOMMUNICATIONS PUBLIC LIMITED COMPANY, London (GB)

(72) Inventor: Philip Clapham, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/733,662

(22) PCT Filed: Mar. 11, 2019

(86) PCT No.: PCT/EP2019/056066
§ 371 (c)(1),
(2) Date: Sep. 25, 2020

(87) PCT Pub. No.: WO2019/185344
PCT Pub. Date: Oct. 3, 2019

(65) Prior Publication Data
US 2021/0011950 A1   Jan. 14, 2021

(30) Foreign Application Priority Data

Mar. 25, 2018 (EP) .................... 18163820

(51) Int. Cl.
*G06F 16/00* (2019.01)
*G06F 16/901* (2019.01)

(52) U.S. Cl.
CPC .............. *G06F 16/9014* (2019.01)

(58) Field of Classification Search
CPC .................................................. G06F 16/9014
See application file for complete search history.

(56) References Cited

U.S. PATENT DOCUMENTS

| 6,697,276 B1 * | 2/2004 | Pereira | G11C 15/00 365/189.07 |
| 9,104,678 B1 | 8/2015 | Nemes et al. | |
| (Continued) | | | |

OTHER PUBLICATIONS

Waldvogel et al. Scalable high-speed prefix matching. (Year: 2001).*
(Continued)

*Primary Examiner* — Syed H Hasan
(74) *Attorney, Agent, or Firm* — Patterson Thunete IP

(57) ABSTRACT

A computer implemented method of storing a data object in a computer memory, wherein the data object is stored at a location in an object store as a portion of the memory, the location being determined by a hashing process based on a generated hash key, the memory further storing: a set of binary words in which each bit of each word identifies an occupancy state of a location in the object store such that an occupancy state of all locations is stored in the set of binary words; and a truncated hash key set storing, for each occupied location in the object store, a truncated hash key for a data object stored at the location, wherein the hashing process uses linear probing in which an occupancy of the location in the object store for storage of the data object is determined, wherein the occupancy is determined by reference to the set of binary words, and the linear probing further determines identity of the data object and an object stored in an occupied location, the identity being determined based on a comparison of the hash key for the data object and a truncated hash key for the occupied location.

7 Claims, 4 Drawing Sheets

(56) References Cited

U.S. PATENT DOCUMENTS

| | | | |
|---|---|---|---|
| 2005/0091443 A1* | 4/2005 | Hershkovich | G06F 16/2246 711/100 |
| 2006/0143168 A1* | 6/2006 | Rossmann | G06F 16/9014 |
| 2013/0268770 A1* | 10/2013 | Hunt | G06F 16/2255 713/189 |
| 2014/0090081 A1* | 3/2014 | Mattsson | G06F 21/6227 726/27 |
| 2016/0124864 A1 | 5/2016 | Sun et al. | |

OTHER PUBLICATIONS

Extended European Search Report for Application No. 18163820.6, dated Jun. 28, 2018, 9 pages.
GB Combined Search and Examination Report for GB Application No. GB1804774.6, dated Oct. 11, 2018, 6 pages.
International Search Report and Written Opinion for Application No. PCT/EP2019/056066 dated Apr. 10, 2019, 10 pages.
Wikipedia "Hash table," Jul. 6, 2012, XP055378731, Retrieved from the Internet: https://en.wikipedia.org/w/index.php?title=Hash table&oldid=500968871 on Jun. 6, 2017, 14 pages.
Wikipedia., "Linear probing," Sep. 14, 2017, XP055474361, Retrieved from the Internet: https://web.archive.org/web/20170914030820/ https://en.wikipedia.org/wiki/Linear_probing on 2018 May 2017, 8 pages.

\* cited by examiner

EFFICIENT DATA OBJECT STORAGE AND RETRIEVAL

PRIORITY CLAIM

The present application is a National Phase entry of PCT Application No. PCT/EP2019/056066, filed Mar. 11, 2019, which claims priority from EP Patent Application No. 18163820.6, filed Mar. 25, 2018, each of which is hereby fully incorporated herein by reference.

FIELD

The present disclosure relates to the storage and retrieval of data objects.

BACKGROUND

Hashing algorithms are commonly used to store data objects in a memory of a computer system. The process of identifying a location in the memory for a data object based on a hashing algorithm can be resource intensive affecting the performance of a data storage and/or retrieval processes. It is therefore desirable to provide efficient data object storage and retrieval.

SUMMARY

The present disclosure accordingly provides, in a first aspect, a computer implemented method of storing a data object in a computer memory wherein the data object is stored at a location in an object store as a portion of the memory, the location being determined by a hashing process based on a generated hash key, the memory further storing: a set of binary words in which each bit of each word identifies an occupancy state of a location in the object store such that an occupancy state of all locations is stored in the set of binary words; and a truncated hash key set storing, for each occupied location in the object store, a truncated hash key for a data object stored at the location, wherein the hashing process uses linear probing in which an occupancy of the location in the object store for storage of the data object is determined, the method is characterized in that the occupancy is determined by reference to the set of binary words, and the linear probing further determines identity of the data object and an object stored in an occupied location, the identity being determined based on a comparison of the hash key for the data object and a truncated hash key for the occupied location.

In some embodiments, a determination of identity based on the comparison is confirmed by a comparison of the data object for storage and a data object stored in the occupied location.

In some embodiments, the linear probing is operable to identify a non-occupied location in the object store for storage of the data object by sequentially traversing occupied locations in the object store and checking, for each traversed location, for identity between the data object and an object stored at the location, such identity indicating the data object is already stored in the object store.

In some embodiments, the hashing process is further operable to delete an item from the object store and, following a deletion, traverse the object store sequentially from the location of the deleted object to identify a stored object for which the hashing process identifies the location of the deleted object as its storage location, and moving the identified object to the location of the deleted object including updating the set of binary words and the truncated hash key set correspondingly, wherein the traversal terminates on one of: an identification of an empty location in the object store; and a determination that all locations have been traversed.

In some embodiments, the hashing process generates a direct reference to the data object stored in the object store as an address of the location of the data object, the direct reference being indicated as expired on deletion of an object from the object store.

The present disclosure accordingly provides, in a second aspect, a computer system including a processor and memory storing computer program code for performing the method above.

The present disclosure accordingly provides, in a third aspect, a computer program element comprising computer program code to, when loaded into a computer system and executed thereon, cause the computer to perform the method described above.

BRIEF DESCRIPTION OF THE DRAWINGS

Embodiments of the present disclosure will now be described, by way of example only, with reference to the accompanying drawings, in which.

DETAILED DESCRIPTION

Figure 1:
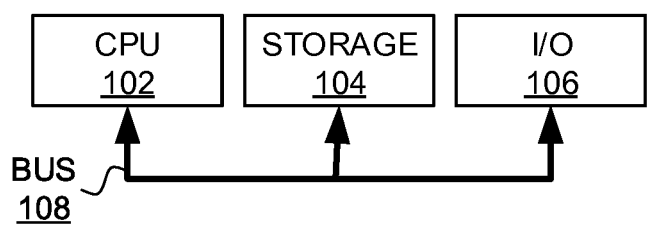
FIG. 1 is a block diagram a computer system suitable for the operation of embodiments.

Embodiments of the present disclosure relate to methods and systems for the storage of objects in a memory of a computer system. Specifically, objects are stored in an object store having a plurality of locations and a location for an object is determined using a hashing algorithm such as any suitable hashing algorithm as known to those skilled in the art. Furthermore, in the event that a location in the object store identified by a hashing algorithm for the storage of an object is already occupied, a linear probing technique is employed, as is well known in the art. Briefly, the linear probing technique involves storing a data object at a sequentially most proximate unoccupied location in the object store traversing the store in a predetermined direction (typically at locations of increasing address). Notably, in some embodiments, the linear probing technique can include wrapping or wrap-around in which a traversal for identifying an unoccupied location loops to a starting location in the object store when a final, last or end location of the object store has been found to be occupied.

Embodiments of the present disclosure provide performance benefits in the object storage process. These benefits are realized by the provision of: a map of binary flags, each flag corresponding to a storage location in the object store, and each flag indicating a state of occupation of the storage location as either occupied or unoccupied; and a set of truncated hash keys, the set including one truncated hash key entry for each location in the object store, whereby unoccupied or not yet occupied locations may have a null, zero or non-entry in the set. The flags and hash key set provide considerable performance advantages in the determination of identity of an object to be stored at a determined location in the object store and an object already stored in the determined location. This includes determining identity at locations sequentially subsequent to the determined location, where non-identity is determined. Where identity can be determined then the object is already stored in the object store and further storage is not required. Where identity is not determined then continued traversing for a free location is occasioned. In existing techniques, a comparison process to check for identity as part of a linear probing process undertakes a direct reference to the object store to determine occupation of a location and a full object comparison to determine identity. Embodiments of the present disclosure do not require direct reference to the object store to determine occupation which is instead determined more efficiently by the bitwise storage of occupation information in the map of binary flags. Furthermore, embodiments of the present disclosure do not require a comparison of all data objects to determine identity—such comparison being resource intensive especially for large multi-byte data objects. Rather, embodiments of the present disclosure compare a hash key of an object for insertion with a partial hash key stored at a determined location in the hash key set. This comparison of a partial hash key involves fewer resources than a direct object comparison and provides performance gains where non-identity can be determined on this basis alone (so avoiding direct object comparison in such cases). In accordance with embodiments of the present disclosure, direct comparison of objects is reserved only for those cases where there is observed to be identity of that part of a partial hash key stored for a location with a corresponding part of a hash key for the data object to be stored.

Thus, in this way, embodiments of the present disclosure provide considerable performance advantages over known techniques, especially for larger data objects. In particular, implementations of data object storage in accordance with embodiments of the present disclosure have exhibited performance exceeding those of the prevailing existing techniques. The performance benefit is especially realized for larger sized data objects. In principle, the performance improvement should be observable for data objects exceeding the size of the truncated hash—such as data objects exceeding 32 bits. In practice, the performance benefit is particularly notable for the storage of data objects over 64 bytes in size. The performance improvement is particularly beneficial for the storage of data objects over 128 bytes in size. The performance improvement is acutely beneficial for the storage of data objects over 256 bytes in size.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor), and a network connection.

Figure 2:
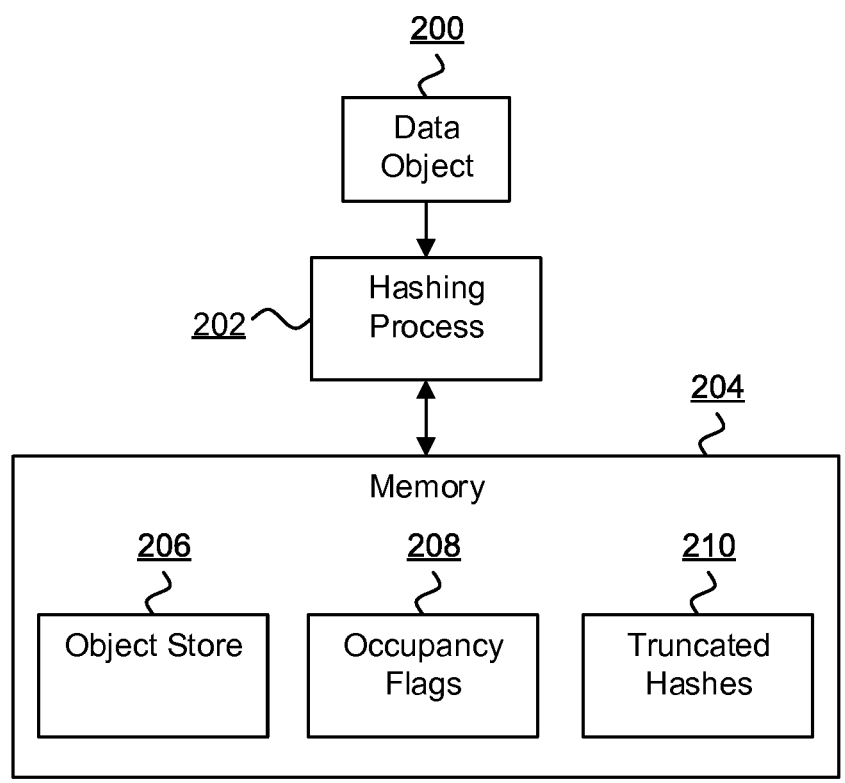
FIG. 2 is a component diagram of an arrangement for storing a data object in a memory of a computer system in accordance with embodiments of the present disclosure.

FIG. 2 is a component diagram of an arrangement for storing a data object 200 in a memory 204 of a computer system in accordance with embodiments of the present disclosure. The memory 204 includes an object store 206, a set of occupancy flags 208, and a set of truncated hash keys 210. The data object 200 is stored at a location in the object store 206 determined by a hashing process 202.

The hashing process 202 determines a location for the data object 200 based on a hashing algorithm that generates a hash value for the data object, as will be apparent to those skilled in the art. The hash value for the data object 200 serves to indicate a location in the object store 206 for the storage of the data object 200. The occupancy flags 208 are binary flags each indicating a state of occupancy of a location in the object store 206. For example, a binary flag having a value of zero can indicate occupation of a corresponding location in the object store 206, and a binary flag having a value of one can indicate non-occupation. Occupation of a location refers to the storage of a data object at the location in the data store. Notably, the state of a flag is authoritative with respect to the storage or not of a data object at a location in the object store 206. That is to say that a location in the object store 206 may contain data and a determination of whether that data constitutes a data object stored in the location is determined with reference to an occupancy flag corresponding to that location. In this way, an object can be deleted from the object store 206 by merely indicating the location of the object as unoccupied in the occupancy flags 208.

The truncated hashes 210 has an entry for each location in the object store 206. When an object is stored at a location in the object store 206 a partial hash key value for the object is stored in a corresponding entry in the set of truncated hashes 210. The partial hash key value constitutes a portion of the hash key for the data object suitable for comparison with hash keys for other data objects to determine a likelihood of identity of data objects. For example, the partial hash key is a truncation of the hash key for a data object, such as portion of the hash key. In preferred embodiments, the truncated hash key is one of: a set of least significant bits of the hash key; a set of most significant bits of the hash key; or a set of bits taken from predetermined range of bit positions within the hash key. Truncated hash keys are stored in the set 210 when data objects are stored in the object store 206.

Figure 3:
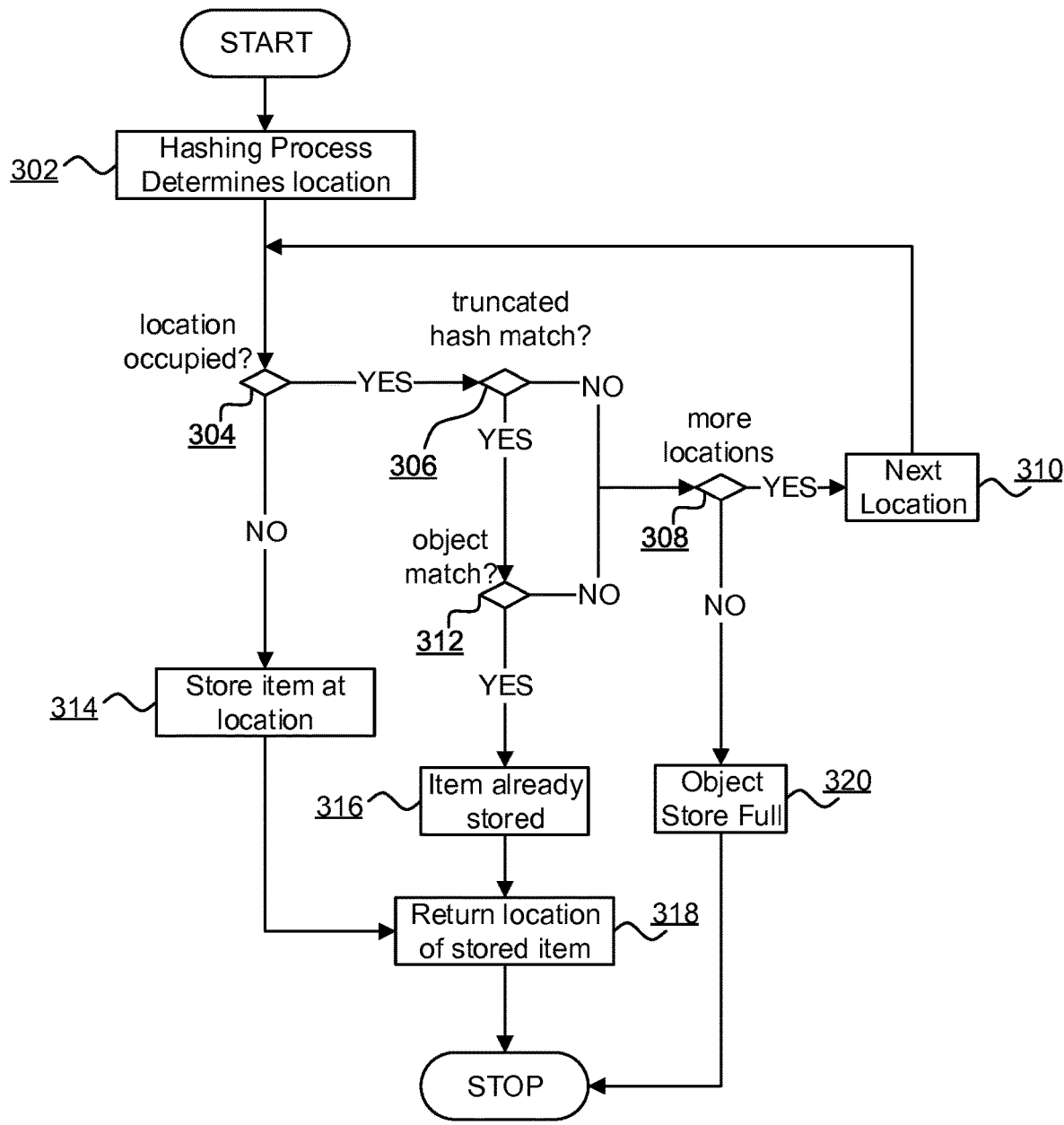
FIG. 3 is a flowchart of a method of storing the data object in the object store of FIG. 1 in accordance with embodiments of the present disclosure.

FIG. 3 is a flowchart of a method of storing the data object 200 in the object store of FIG. 1 in accordance with embodiments of the present disclosure. Initially, at 302, the method employs the hashing process 202 to determine a location in the object store 206 for the storage of the data object 200. At 304 the method determines if the determined location in the object store 206 is already occupied. This determination can be made efficiently with reference to the occupancy flags 208. Where the location is not occupied, the method stores the data object 200 in the object store 206 at the determined location at 314 and returns the location of the stored item at 318.

Where the location is determined to be occupied the method proceeds to 306 where a truncated hash for the determined location is compared with the hash of the data object 200 to determine if the data object may be identical to an object already stored at the location in the object store 206. Where the truncated hash matches a corresponding portion of the hash key for the data object 200 at 306, the method proceeds to 312 where an object stored at the determined location is compared with the data object 210 to confirm identity. If identity of the objects is confirmed at 312, the data object is determined to be already stored in the object store at 316 and the location of the existing stored object is returned at 318.

Where the truncated hash did not match the hash key of the data object 200 at 306, or the objects were not found to be identical at 312, the method determines if there are more locations in the object store 206 to be checked at 308. If there are no more locations then the object store 206 is determined to be full at 320. Otherwise, a next location in the object store is considered from 310 and the method iterates to 304 for the new location. Notably, the operation of FIG. 3 can involve looping or wrapping to a first, start, or lowest location following traversal of a last, end, or highest location.

In some embodiments, the method of FIG. 3 further provides a direct pointer to the location of the stored data object in the object store 206, such as a memory pointer or the like. Such a pointer can be provided at, for example, 318.

Figure 4:
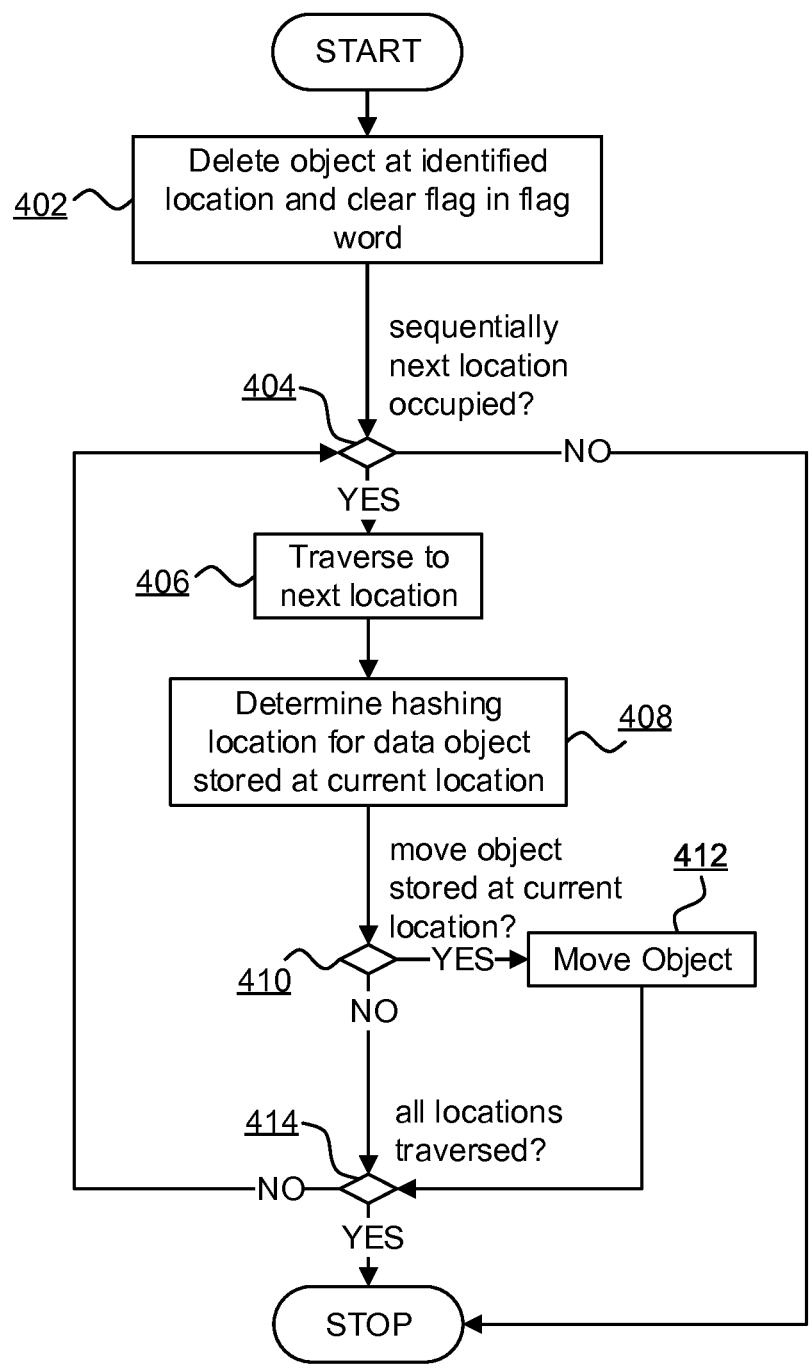
FIG. 4 is a flowchart of a method of removing a data object in the object store of FIG. 1 in accordance with embodiments of the present disclosure.

FIG. 4 is a flowchart of a method of removing a data object in the object store of FIG. 1 in accordance with embodiments of the present disclosure. Initially, at 402, the method deletes the data object at an identified location in the object store 206, such deletion can be made by merely updating the occupancy flag for the location and, optionally, by actually deleting or overwriting the data stored at the location in the object store 206. Thus, the deletion renders the location newly unoccupied. For example, the method of FIG. 4 may operate on the basis of a pointer or address of a particular location in the object store 206 in which case a data object stored therein is deleted. Alternatively, the method of FIG. 4 may operate on the basis of a hash key or a data object from which a hash key is generated, a location for such hash key or data object being identified in the object store 206 as part of the process of 402.

Subsequently, at 404, the method identifies a sequentially next location in the object store 206 and determines if the next location is occupied. Notably, the operation of the method of FIG. 4 can involve looping or wrapping to a first, start, or lowest location following traversal of a last, end, or highest location. If the next location is not occupied the method ends, otherwise the method traverses to the next location at 406. At 408 the method examines a data object stored in the location and determines a preferred location for the data object based on the hashing algorithm. Notably, the location at which the data object is stored may not be the location indicated by a hash key for the data object since the data object may have been stored at a different location in the object store 206 due to occupancy of the proper location according to the insertion method of FIG. 3. Accordingly, there can be considered to be an actual location of the data object (the current location) and a preferred location of the data object (that location in the object store 206 indicated by the hashing algorithm).

At 410 the method undertakes a determination whether the data object stored at the current location should be moved to the newly unoccupied location. This determination can be made by comparing the preferred location for the data object determined at 408 with the newly unoccupied location. If the newly unoccupied location is closer to, or the same as, the preferred location determined at 408 then the data object at the current location should be moved to the newly unoccupied location. This move takes place at 412. As part of this move, the data object is copied to the newly unoccupied location and is deleted from the current location (such as by marking the current location as unoccupied). Thus, the current location becomes newly unoccupied and, thus, the newly unoccupied location.

The method iterates through all occupied locations via 414 until either, at 414, all locations in the object store 206 have been traversed or, at 404, an unoccupied location is encountered. Thus, in this way, object deletion from the object store 206 is supplemented by moving objects to be more proximate to their preferred location according to the hashing algorithm.

Notably, in embodiments where a direct pointer or reference to a location of a stored object in the object store 206 is provided by a data object insertion method such as that of FIG. 3, such direct pointers will cease to be valid following the deletion method of FIG. 4 since the deletion method can involve the moving of data objects in the object store 206. Accordingly, it is necessary to indicate that such direct pointers or references cease to be valid following a deletion by, for example, marking such references as expired. In one embodiment, direct pointers or references have associated an identifier of an age, generation, or other indicator corresponding to their validity and their invalidity is indicated by a global change to an age, generation or such indicator such that all pointers or references having old, expired, outdated, or non-current indications are treated as expired.

One exemplary embodiment of the present disclosure will now be described. The exemplary embodiment is known as PHashSet and can be provided as, for example, a C++ template which can be used with most data types that provide an implementation of std::hash to create a hash value, and an implementation of std::equal_to to check hash key equality. Functional methods known as reserve, find, insert, and erase methods will be described and a linear probing strategy is adopted. Herein below, the term "hash set" is used to refer to the combination of the object store 206, the occupancy flags 208, and the truncated hashes 210 as previously described.

PHashSet provides a stable hash set on insertion, i.e. elements do not to move on insertion. This is not the case when data objects are erased as erasure may cause objects to be moved. Such movement could cause unexpected behavior, so a smart-pointer can be provided. The smart-pointer is returned by an insert method and can be passed to an erase method. According to this embodiment, when a smart-pointer is populated it stores the number of erases that have taken place in the hash set at that time. When a smart-pointer is used, the number of erasures associated with the pointer is checked to see if a global count of erasures differs from that number. If there is a mismatch between erasure counts then a system fault (e.g. segfault, reference fault, or similar) can be generated to indicate that the smart-pointer is outdated. In such an event, the find method can be employed to generate a new smart-pointer for a data object.

In the exemplary embodiment, PHashSet creates, at initialisation, a set of 64-bit words to use as flags to indicate the presence or absence of a valid data object in a particular location (i.e. occupancy flags 208). One bit is used per location. For example, a binary 1 indicates that the location is unoccupied, and a binary 0 indicates that the location is occupied.

A reserve method can be provided to generate a fixed size hash set having a suitably sized object store 206 and suitably configured data structures for the occupancy flags 208 and the truncated hashes 210. Required memory is preferably pre-allocated for a given size of the object store 206 allowing for reduced per-item timing deviation during execution. Preferably, only hash set sizes which are a power of 2 (e.g. 4096, 8192, etc.) are used, with a minimum of 64 locations.

PHashSet stores the set of flag words as occupancy flags 208, a 32-bit truncation of a hash for every stored data object as truncated hashes 210, and a copy of the items being stored as object store 206.

In the exemplary embodiment, an insertion/find method is provided. It can be advantageous in this embodiment to insert a given data object into the hash set, returning an indicator to it, or, for an object already present in the hash set, it will return the object, it's hash key, location and/or smart-pointer.

On insertion PHashSet computes a hash for a given data object and masks it against the hash set size (minus one, to account for the 0th element). A flag word is located for the intended location which is then checked to see if the preferred location is in use. If it is, then the hash value for the item stored at the preferred location is compared against the 32-bit truncated hash for the new data object. If the truncated hash matches the corresponding portion of the hash value then the new and stored data objects are compared using std::equal_to. If the data objects are equal (i.e. identity), then the data object is determined to be already stored in the hash set and a reference to it is returned, such as a smart-pointer as previously described. Checking the hash equality initially with the truncated hash improves performance significantly because comparing 32-bit integers is significantly quicker than comparing larger data objects. If the location is in use but fails either the hash similarity or data object equality checks, then a next location is selected in the object store 206, advancing to the next flag word if necessary. This is known as linear probing and is well suited to PHashSet because it could involve checking the next bit along in the empty flag words, which is very cache friendly. The occupancy check, truncated hash check and data object identity check are then repeated as necessary until the data object is located in the hash set or an empty location is encountered, at which point the data item is inserted and a pointer to it returned within a smart-pointer.

PHashSet detects if the set is full and returns an indicator to state that this is the case.

An exemplary data object erase method is provided accepting either a data object being stored or a smart-pointer previously returned by the insert/find method. In the former case the procedure starts by finding the element within the hash set, resulting in a smart-pointer being produced. Subsequently, the hash set locates the flag word for the location being cleared (erased) and sets it to indicate that the location is newly unoccupied. The next location (in the next flag word if appropriate) is then checked, and if that is empty the function completes. If the next location is not empty then PHashSet obtains the hash for the data object in that next location to see if it would be closer to its preferred location if it were in the location that was just erased (the newly unoccupied location). If so, then the object is moved to the newly unoccupied location. This procedure repeats until an empty location is found (or the entire hash set is traversed).

Figure 5:
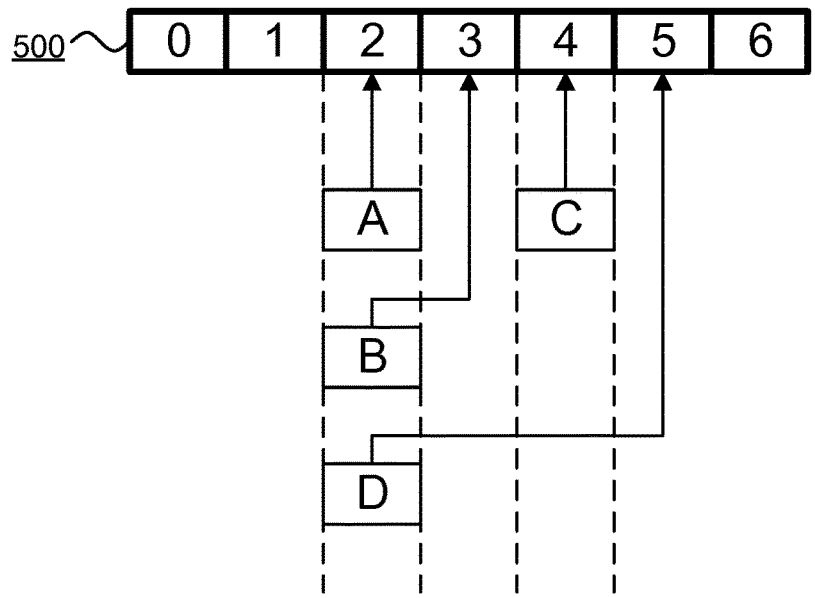
FIG. 5 illustrates an exemplary object store for the storage of objects in accordance with embodiments of the present disclosure.

It is important to note that data objects that would not be made closer to their preferred location by being moved are not moved, and other objects might leapfrog them to be closer to their ideal slot. This process is illustrated in FIG. 5 which illustrates an exemplary object store for the storage of objects in accordance with embodiments of the present disclosure. In the example of FIG. 5, data object "A" hashes to location 2 in an exemplary object store 500. On insertion, object "A" is thus placed in location 2. Data object "B" also hashes to location 2, but because "A" is stored in location 2 object "B" is forced to be placed in location 3. Data object "C" hashes to location 4 and is placed there. Data object "D" hashes to location 2, but cannot go in any of locations 2, 3, or 4 because they are occupied, so object "D" is stored in location 5. If item "A" was subsequently deleted then object "B" would move to location 2 and object "D" would move to location 3. Object "C" would not move. This procedure would be the same if the chain began in location 6 and wrapped around to location 0.

Data objects being deleted from the locations may not be actually affected by an erase operation, unless overwritten by another object being moved on top of them. Instead, PHashSet can employ the occupancy flags 208 to determine whether an object at a location should be read or not. This is a significant gain in performance.

When an erase is performed, the erase count is incremented, which will cause all smart-pointers created before that time to create an error. This could be refined at a cost to performance and memory use, by having an erase count per flag word with each smart-pointer tracking the erase count for its flag word; only becoming invalid when that flag word is altered during an erase.

Figure 6:
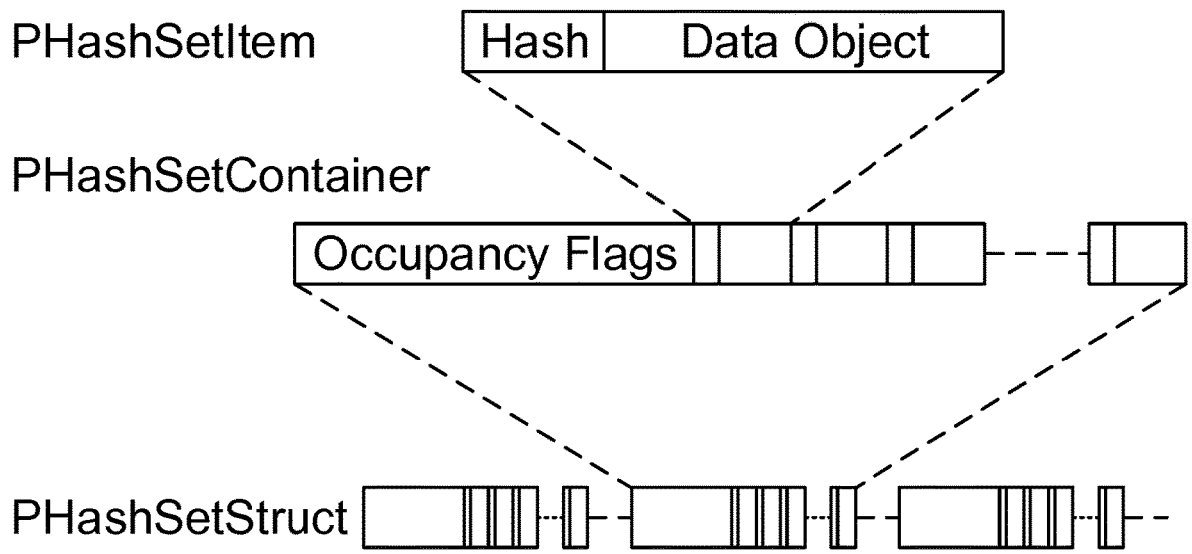
FIG. 6 illustrates an exemplary arrangement of data structures in accordance with embodiments of the present disclosure.

A further exemplary embodiment of the present disclosure is illustrated with respect to FIG. 6 which illustrates an exemplary arrangement of data structures in accordance with embodiments of the present disclosure. According to the further exemplary embodiment, instead of cached hashes, objects, and empty flag words being stored in separate data structures such as separate arrays, they can be stored as nested objects. Such an arrangement can be referred to as PHashSetStruct which is a container object containing a single flag word (64 bits, indicating 64 slots) as well as a set of 64 hashes, each directly followed by the object that created them, as illustrated in FIG. 6. This means when searching for a hash key (in the insert/find method), loading the precomputed hash value is also likely to load the object into the cache, meaning checking for key equality is less likely to cause a cache miss Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure. It will be understood by those skilled in the art that, although the present disclosure has been described in relation to the above described example embodiments, the disclosure is not limited thereto and that there are many possible variations and modifications which fall within the scope of the disclosure. The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of storing a data object in a computer memory, wherein the data object is stored at a location in an object store as a portion of the computer memory, the location being determined by a hashing process based on a generated hash key, the computer memory further storing: a set of binary words in which each bit of each word identifies an occupancy state of a location in the object store such that an occupancy state of all locations is stored in the set of binary words; and a truncated hash key set storing, for each occupied location in the object store, a truncated hash key for a data object stored at the location, wherein the hashing process uses linear probing in which an occupancy of the location in the object store for storage of the data object is determined, the method comprising:
   determining the occupancy by reference to the set of binary words; and
   determining by the linear probing an identity of the data object and an object stored in an occupied location, the identity being determined based on a comparison of the hash key for the data object and a truncated hash key for the occupied location.

2. The method of claim 1, wherein the determination of the identity based on the comparison is confirmed by a comparison of the data object for storage and a data object stored in the occupied location.

3. The method of claim 1, wherein the linear probing is operable to identify a non-occupied location in the object store for storage of the data object by sequentially traversing occupied locations in the object store and checking, for each traversed location, for an identity between the data object and an object stored at the location, the identity indicating the data object is already stored in the object store.

4. The method of claim 1, wherein the hashing process is further operable to delete an item from the object store and, following a deletion, traverse the object store sequentially from a location of the deleted object to identify a stored object for which the hashing process identifies the location of the deleted object as its storage location, and moving the identified object to the location of the deleted object, including updating the set of binary words and the truncated hash key set correspondingly, wherein the traversal terminates on one of:
   an identification of an empty location in the object store; or
   a determination that all locations have been traversed.

5. The method of claim 4, wherein the hashing process generates a direct reference to the data object stored in the object store as an address of the location of the data object, the direct reference being indicated as expired on deletion of an object from the object store.

6. A computer system comprising:
   a processor and memory storing computer program code for storing a data object in a computer memory, wherein the data object is stored at a location in an object store as a portion of the computer memory, the location being determined by a hashing process based on a generated hash key, the computer memory further storing: a set of binary words in which each bit of each word identifies an occupancy state of a location in the object store such that an occupancy state of all locations is stored in the set of binary words; and a truncated hash key set storing, for each occupied location in the object store, a truncated hash key for a data object stored at the location, wherein the hashing process uses linear probing in which an occupancy of the location in the object store for storage of the data object is determined, by:
      determining the occupancy by reference to the set of binary words; and
      determining by the linear probing an identity of the data object and an object stored in an occupied location, the identity being determined based on a comparison of the hash key for the data object and a truncated hash key for the occupied location.

7. A non-transitory computer-readable storage medium storing a computer program element comprising computer program code to, when loaded into a computer system and executed thereon, cause the computer system to perform the method as claimed in claim 1.

* * * * *